United States Patent [19]

Suzuki

[11] Patent Number: 5,027,199

[45] Date of Patent: Jun. 25, 1991

[54] IMAGE PICKUP SYSTEM CAPABLE OF OBTAINING A PLURALITY OF STEREO IMAGES WITH DIFFERENT BASE HEIGHT RATIOS

[75] Inventor: Naoshi Suzuki, Tokyo, Japan

[73] Assignee: NEC Corporation, Japan

[21] Appl. No.: 410,104

[22] Filed: Sep. 20, 1989

[30] Foreign Application Priority Data

Sep. 20, 1988 [JP] Japan ................... 63-237073

[51] Int. Cl.$^5$ ...................... H04N 13/00; H04N 15/00
[52] U.S. Cl. ......................................... 358/88; 358/89; 358/3; 358/109
[58] Field of Search .................. 358/88, 89, 3; 73/861

[56] References Cited

U.S. PATENT DOCUMENTS

| | | | |
|---|---|---|---|
| 4,613,899 | 10/1986 | Kuwano et al. | 358/88 |
| 4,749,273 | 6/1988 | Reinhold | 73/861 |
| 4,798,210 | 1/1989 | Ledley | 358/88 |

Primary Examiner—Howard W. Britton
Assistant Examiner—Wendy R. Greening
Attorney, Agent, or Firm—Ostrolenk, Faber, Gerb & Soffen

[57] ABSTRACT

In an image pickup system for use in combination with a craft (50) flying over an object zone (51), a plurality of photoelectric transducers are arranged in the craft to pick up partial images of the object zone, respectively, and are divided into forward and backward halves that are operable in cooperation with a signal processing unit (65) to obtain a stereo image of the object zone from the partial images. A selected one of the partial images is picked up from a selected one of the forward half transducers at a time instant and is thereafter picked up again at another time instant with an interval left between the time instants from another one of the backward half transducers that is symmetrical with the selected forward half transducer and spaced apart a predetermined number of photoelectric transducers from the selected forward half transducer. The interval is defined by the predetermined number. The signal processing unit may be located either in the craft or in a ground station.

7 Claims, 8 Drawing Sheets

| BASE HEIGHT RATIO | THE NUMBERS ASSIGNED TO A PAIR OF PHOTOELECTRIC TRANSDUCERS | |
|---|---|---|
| 0.3 | 1 | 1001 |
| 0.2 | 167 | 835 |
| 0.1 | 333 | 669 |

IMAGE PICKUP SYSTEM CAPABLE OF OBTAINING A PLURALITY OF STEREO IMAGES WITH DIFFERENT BASE HEIGHT RATIOS

BACKGROUND OF THE INVENTION

This invention relates to an image pickup system for use in combination with a craft, such as a spacecraft, flying over an object zone which is typically on the ground surface of the earth. Such an image pickup system is particularly useful in a remote sensing system for the earth.

An image pickup system of the type described is used to remotely sense an object zone on board a craft flying over an object zone along a flying direction at a predetermined flight altitude. In a remote sensing system, it is often necessary to pick up a stereo image, such as a stereo topographic image, from the object zone by the use of the image pickup system. In order to provide the stereo image, the object zone should be picked up, along the flying direction at two positions spaced apart from each other, so as to form two optical images of the object zone. A conventional image pickup system has at least two optical systems for deriving the stereo image. Such a conventional image pickup system has a disadvantage such that it inevitably becomes heavy and bulky.

In order to remove the above-described disadvantage, an improved image pickup system is disclosed in U.S. Pat. No. 4,613,899 issued to Ryushi Kuwano et al and assigned to the instant assignee. In the image pickup system of the Kuwano et al patent, a single optical system is used in the craft to form, on a focussing area, optical images of forward and backward zones lying transversely of the flying direction in the object zone. The forward and the backward zones are positioned at a predetermined distance along the flying direction. Forward and backward optical images are picked up from the forward and the backward zones. The forward and the backward optical images are transduced into forward and backward electrical signals by the use of forward and backward photoelectric transducing members, respectively, placed on the focussing area with a gap left therebetween. The forward and the backward electrical signals are processed so that the forward and the backward optical images are reproduced either on board the craft or in a ground station to provide the stereo image. In practice, the forward electrical signal is delayed by a predetermined time interval into a delayed signal. The predetermined time interval is such that the delayed electrical signal appears concurrently with the backward electrical signal. In other words, the delayed signal is produced after the craft flies the predetermined distance.

The ratio between the flight altitude of the craft and the predetermined distance is called a base height ratio in the art. If the object zone has hills and valleys, it is desirable that the base height ratio should have a small value in order to clearly represent the hills and the valleys. If the object zone is flat, the base height ratio should have a large value.

The stereo image pickup system of the Kuwano et al patent provides a single base height ratio alone and therefore can not provide the stereo images with various base height ratios.

SUMMARY OF THE INVENTION

It is therefore an object of this invention to provide an image pickup system which is capable of reproducing a plurality of stereo images with different base height ratios.

It is another object of this invention to provide an image pickup system of the type described, which comprises a single optical system.

An image pickup system to which this invention is applicable, is for a craft having a predetermined direction and flying over an object zone. The image pickup system comprises an optical system in the craft for producing an optical image of the object zone on a focussing area and image processing means coupled to the optical system for electrically processing the optical image.

According to this invention, the image processing means comprises a predetermined number of photoelectric transducers on the focussing area to transduce the optical image into partial electric signals representative of partial zones of the object zone when the craft flies over each of the partial zones. The predetermined number is greater than three. The partial zones are in one-to-one correspondence to the photoelectric transducers. The image processing means further comprises signal processing means coupled to the photoelectric transducers for processing the partial electric signals into a plurality of stereo images.

DESCRIPTION OF THE PREFERRED EMBODIMENT

Figure 1:
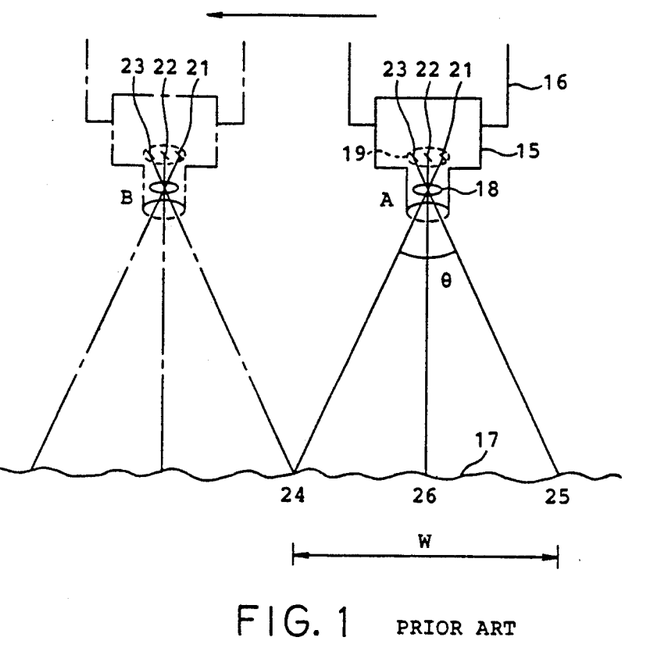
FIG. 1 is a pictorial view of a topographic area and a craft at two positions for use in describing a conventional image pickup system.

Referring to FIG. 1, description will be made as regards a conventional image pickup system in order to facilitate a clear understanding of this invention. The conventional image pickup system is of the type disclosed in the Kuwano et al patent referred to hereinabove.

In FIG. 1, an image pickup system comprises an image pickup apparatus 15 carried on a craft which is symbolically depicted at 16. It is assumed that the craft 16 has a velocity V (meter/second) and flies over an object zone 17 at a flight altitude H and along a flying direction depicted by an arrow. The image pickup apparatus 15 serves to pick up a stereo image and a nonstereo or mono image from the object zone 17. The craft 16 is assumed to be present at a flight position A at a first instant.

The apparatus 15 comprises a single optical system 18 directed towards the object zone 17. The object zone 17 forms a visual angle $\theta$ at the optical system 18. The optical system 18 forms an optical image of the object zone 17 on a focussing area 19. As will later be described more in detail, first through third photoelectric transducers 21, 22, and 23 are disposed parallel on the focussing area 19 transversely of the flying direction. A distance between the first and the third photoelectric transducers 21 and 23 is defined by the visual angle $\theta$.

The object zone 17 lies between forward and backward partial zones 24 and 25 which are defined by the visual angle $\theta$. The object zone 17 is divided along the flying direction into a plurality of partial zones from which partial optical images are picked up to be focussed on the focussing area 19. In the example being illustrated, only an intermediate partial zone 26 and the forward and the backward partial zones 24 and 25 are illustrated. The intermediate partial zone 26 is between the forward and the backward partial zones 24 and 25 and lies right under the craft 16. The forward partial zone 24 is positioned at a distance of W (meter) from the backward partial zone 25 along the flying direction.

The first photoelectric transducer 21 transduces the partial optical image picked up from the forward partial zone 24 to a forward signal. The second and the third photoelectric transducers 22 and 23 transduce the partial optical images of the intermediate partial zone 26 and the backward partial zone 25 to intermediate and backward signals, respectively.

Let the craft 16 fly from the flight position A to a flight position B at a second instant. As well known in the art, the stereo image is formed by processing the forward signal derived from the first photoelectric transducer 21 at the flight position A and the backward signal later derived from the third photoelectric transducer 23 at the flight position B. A nonstereo image is obtained by processing the intermediate signal derived from the photoelectric transducing member 22.

Each of the photoelectric transducers 21 to 23 may be, for example, a charge-coupled device (CCD). Accordingly, the photoelectric transducers 21 to 23 produce successions of image pulses having a constant readout frequency and a variable amplitude as image pulse successions.

Figure 2:
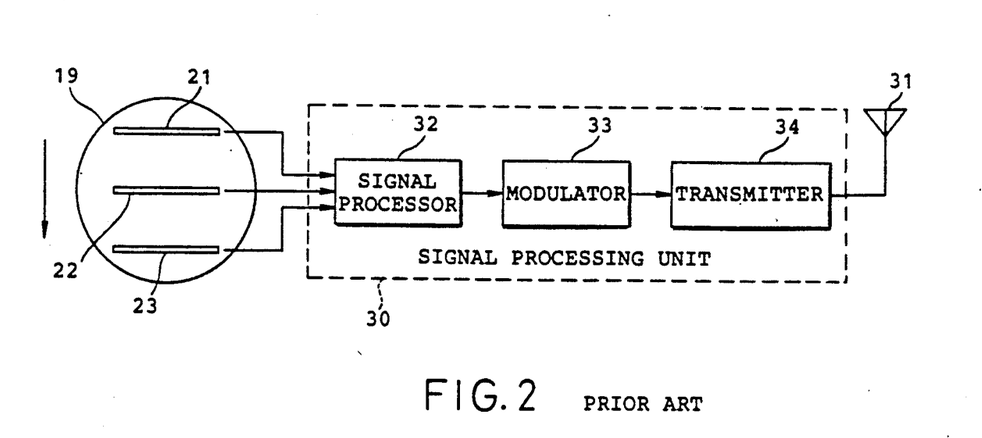
FIG. 2 is a schematic block diagram of a signal processing unit and an optical system illustrated in FIG. 1.

Referring to FIG. 2, the craft carries a signal processing unit 30 and an antenna 31. The image pulse successions are sent from the photoelectric transducers 21 through 23 to a signal processor 32. The signal processor 32 encodes the image pulse successions into an encoded image data succession. The encoded image data succession is modulated by a modulator 33 into a modulated image data succession. The modulated image data succession is transmitted by a transmitter 34 through the antenna 31 to a ground station which will shortly be described. The signal processing unit 30 may comprise a storage unit for temporarily storing the encoded image data succession.

Figure 3:
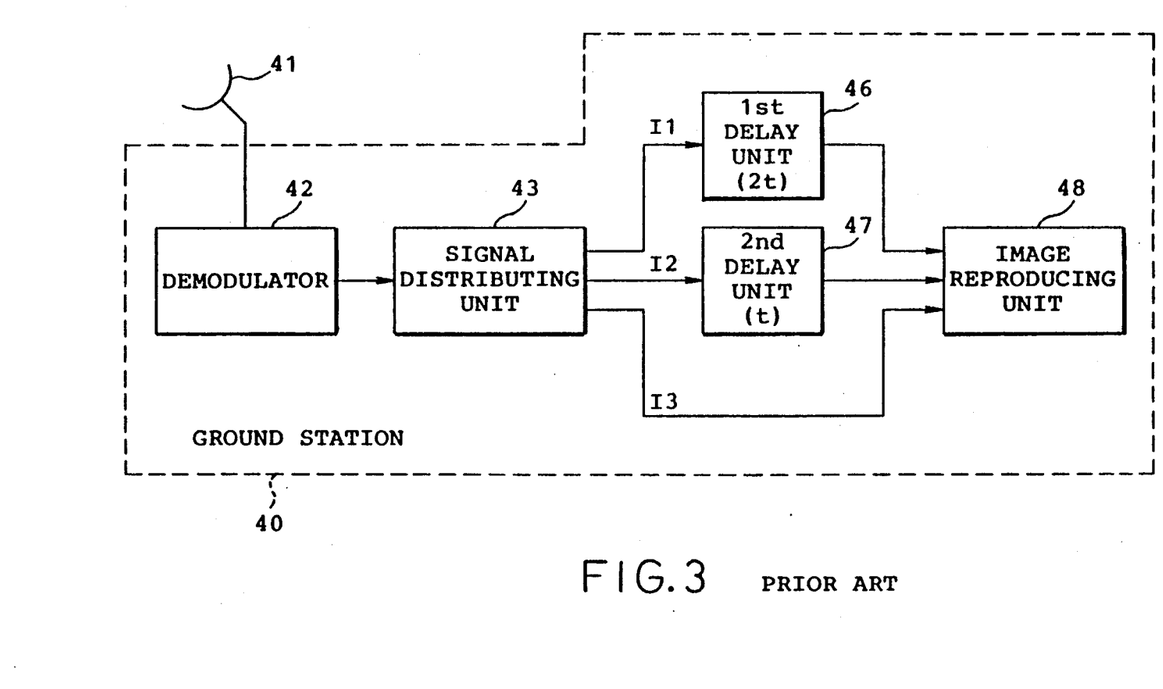
FIG. 3 is schematic block diagram of a ground station operable as a part of the image pickup system illustrated in FIG. 1.

Referring to FIG. 3, the ground station is symbolically depicted at 40 and is operable as a part of the image pickup system. The modulated image data succession transmitted from the craft 16 (FIG. 1) is received at an antenna 41 and sent to a demodulator 42 so as to be demodulated into a demodulated image data succession. Responsive to the demodulated image data succession, a signal distributing unit 43 divides the demodulated image data succession into first, second, and third image data trains I1, I2, and I3 which correspond to the first through the third photoelectric transducers 21, 22, and 23, respectively.

The first and the second image data trains I1 and I2 are delivered to first and second delay units 46 and 47 having first and second delay times. The first delay time is equal to twice the second delay time. Therefore, the first and the second delay times will be represented by 2t and t, respectively. The first and the second image data trains I1 and I2 are supplied to an image reproducing unit 48 through the first and the second delay units 46 and 47, respectively. The third image data train I3 is sent directly to the image reproducing unit 48. The image reproducing unit 48 reproduces the first through the third image data trains I1 to I3 to form the stereo image and the nonstereo image.

Referring back to FIG. 1, let each of the distances between the forward partial zone 24 and the intermediate partial zone 26 and between the intermediate partial zone 26 and the backward partial zone 25 be equal to W/2 (meter). In this event, the craft 16 flies from the flight position A to the flight position B in a time interval 2T (second). The time interval 2T is given by:

$$2T = W/v.$$

This means that the forward partial zone 24 is again picked up by the third photoelectric transducer 23 the time interval 2T after the forward partial zone 24 is previously picked up by the first photoelectric transducer 21. Taking the above into consideration, the first delay time 2t of the first delay unit 46 is rendered equal to the time interval 2T so as to form the stereo image of the forward partial zone 24. The stereo image of the forward partial zone 24 can be obtained by processing the first image data train I1 delayed by the first delay unit 46 and the third image data train I3.

On the other hand, the craft 16 forwardly flies through the distance W/2 from the intermediate partial zone 26 to the forward partial zone 24 during a half of the time interval 2T. As a result, the forward partial zone 24 is picked up by the second photoelectric transducer 22. After the half of the time interval 2T, the craft 16 reaches the flight position B. In order to derive the stereo image and the nonstereo image of the forward partial zone 24 at the same time, the second delay time t is given to the second image data train I2 by the second delay unit 47.

By the way, a ratio of the flight altitude H to the distance W is called a base height ratio as known in the art. As is obvious from FIG. 1, the base height ratio is related to the visual angle $\theta$. The image pickup system provides only a single stereo image defined by the base height ratio.

Figure 4:
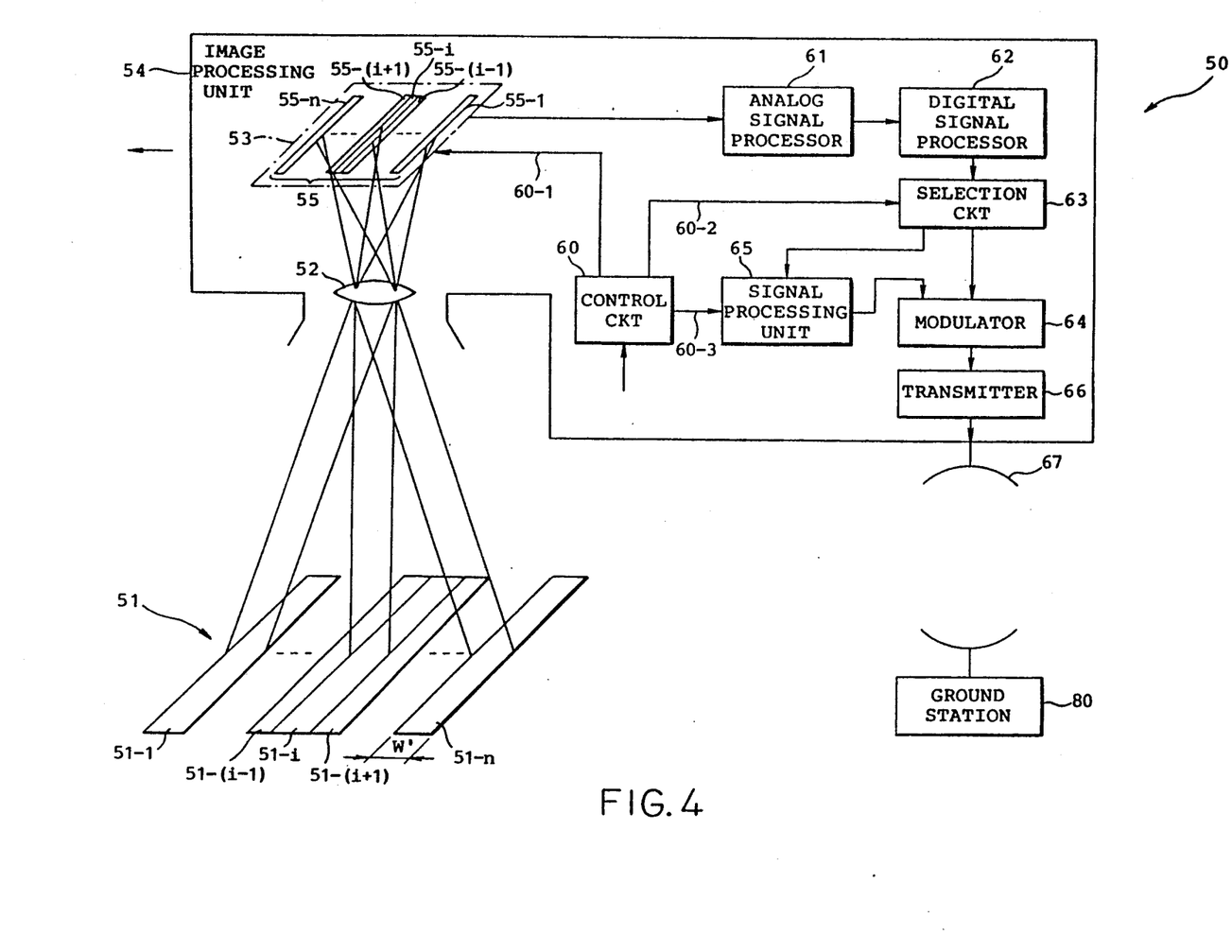
FIG. 4 is a partially perspective pictorial view of an object zone and a craft for use in describing an image pickup system according to an embodiment of this invention.

Referring to FIG. 4, the description will proceed to an image pickup system according to a preferred embodiment of this invention. The image pickup system is of the type which is for use in combination with a craft symbolically depicted at 50. It will be assumed for the time being that the craft is a spacecraft. The spacecraft flies over an object zone 51 of the earth in a predetermined direction depicted by an arrow along a predetermined orbit. The predetermined orbit has an altitude H.

The image pickup system comprises a single optical system 52 carried on the spacecraft 50 and directed towards the object zone 51. The optical system 52 forms an optical image of the object zone 51 on a focussing area 53. In the manner which will presently be described, the object zone 51 is divided into a plurality of partial zones. It is assumed that the number of the partial zones is equal to an odd number n which is greater than three. In this event, the object zone 51 is divided into first through n-th partial zones 51-1, ..., 51-(i−1), 51-i, 51-(i+1), ..., and 51-n where i is equal to $(n+1)/2$. Each of the partial zones lies transversely of the predetermined direction and has a partial zone width W' along the predetermined direction. The i-th partial zone 51-i lies along a zone center line extended transversely of the predetermined direction. Under the circumstances, each of the first through the (i−1)-th partial zones 51-1 to 51-(i−1) is called a forward partial zone while the (i+1)-th through the n-th partial zones 51-(i+1) to 51-n is called a backward partial zone. The optical image of the object zone 51 is divided into first through n-th partial images which are in one-to-one correspondence to the first through the n-th partial zones 51-1 to 51-n.

The image pickup system further comprises an image processing unit 54 comprising a photoelectric transducing member 55. The photoelectric transducing member 55 has a member center line lying transversely of the predetermined direction and consists of first through n-th photoelectric transducers 55-1, ..., 55-(i−1), 55-i, 55-(i+1), ..., and 55-n on the focussing area 53 parallel to one another. It is to be noted here that suffix numbers of the first through the n-th photoelectric transducers 55 (suffix omitted) are numbered in an inverse sense relative to the suffix numbers of the first through the n-th partial zones 51. Each of the photoelectric transducers is, for example, a linear array charge-coupled device and consists of a plurality of photoelectric elements extended parallel to the member center line. It is needless to say that the i-th photoelectric transducer 55-i lies on the member center line. The first through the n-th photoelectric transducers 55 are in one-to-one correspondence to the first through the n-th partial zones 51 (suffix omitted). It is now understood that the first through the n-th photoelectric transducers 55 divide the object zone 51 into the first through the n-th partial zones 51. The photoelectric transducers 55 transduce the partial images of the first through the n-th partial zones 51 into first through n-th partial signals. Each of the first through the (i−1)-th photoelectric transducer 55-1 to 55-(i−1) may be called a forward photoelectric transducer while each of the (i+1)-th through the n-th photoelectric transducer 55-(i+1) to 55-n may be called a backward photoelectric transducer. Similarly, each of the first through the (i−1)-th partial signals may be called a forward partial signal while each of the (i+1)-th through the n-th partial signals may be called a backward partial signal.

The first and the n-th photoelectric transducers 55-1 and 55-n are symmetrical on both sides of the member center line and spaced apart by a maximum distance determined by the photoelectric transducers, (n−2) in number. Likewise, the (i−1)-th and the (i+1)-th photoelectric transducers 55-(i−1) and 55-(i+1) are symmetrical on both sides of the member center line and spaced apart by a minimum distance determined by the i-th photoelectric transducer 55-i. Strictly speaking, two adjacent ones of the photoelectric transducers 55 are spaced apart by a certain spacing. The maximum and the minimum distances are defined above by neglecting the spacing.

As will later be described more in detail, the maximum and the minimum distances determine a maximum visual angle and a minimum visual angle at the optical system 52. The maximum visual angle covers the whole object zone 51 while the minimum angle covers the (i−1)-th, the i-th, and the (i+1)-th partial zones 51-(i−1) to 51-(i+1). The visual angle is related to the base height ratio as will shortly be described.

Figure 5:
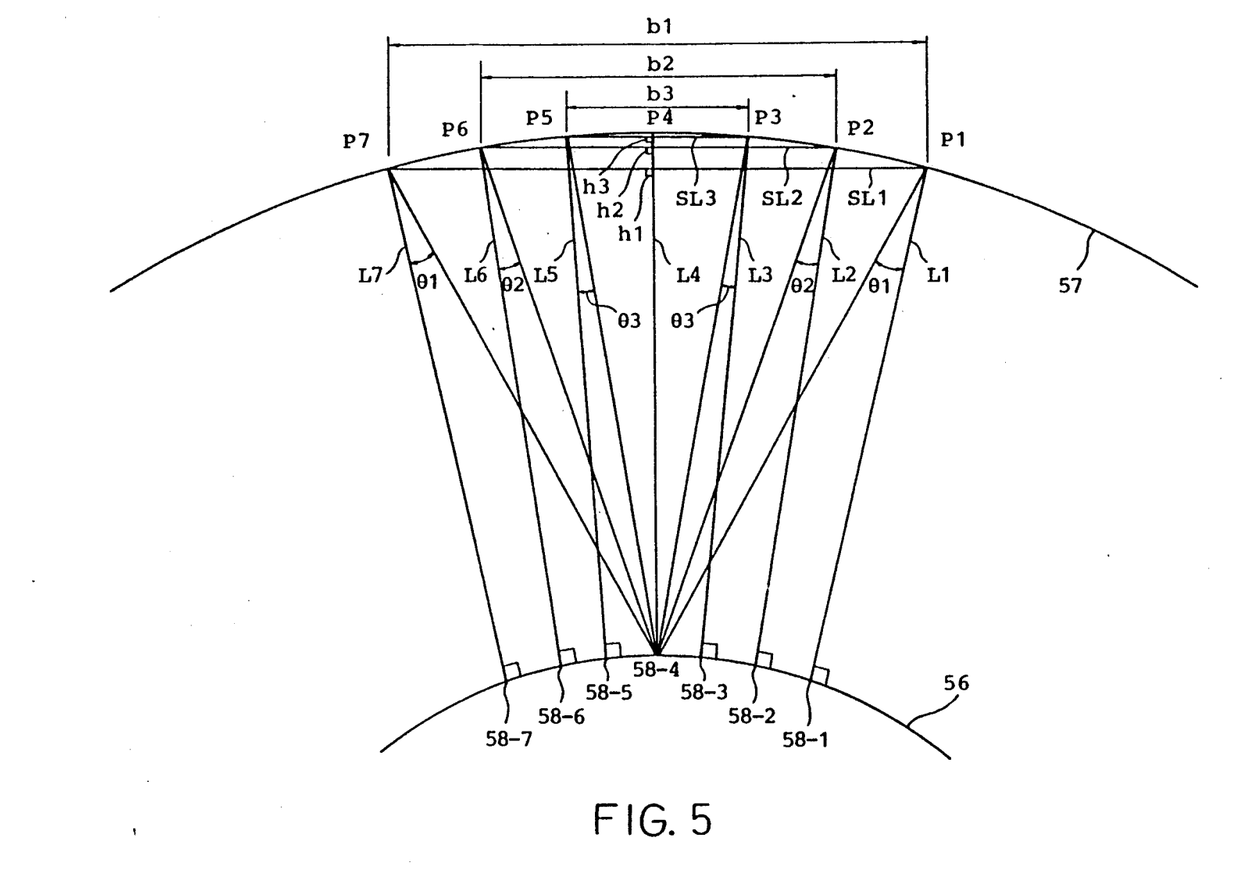
FIG. 5 is a side view for use in describing base height ratios.

Referring to FIG. 5, the description will proceed to the base height ratio. When the image pickup device is used in the spacecraft, calculation of the base height ratio is a little different from that described in conjunction with FIG. 1 because the spacecraft flies with an altitude which is much higher than the flight altitude of the earth bound craft.

In FIG. 5, the spacecraft flies over the earth symbolically depicted at 56 with a constant flight altitude H along a predetermined orbit depicted at 57. Let the spacecraft fly from a first flight position p1 to a seventh flight position p7 through second through sixth flight positions p2, p3, p4, p5, and p6. First through seventh zones lie right under the first through the seventh flight positions p1 to p7 and are depicted at 58-1, 58-2, 58-3, 58-4, 58-5, 58-6, and 58-7. It will be assumed that the first and the seventh flight positions p1 and p7 are symmetrical on both sides of the fourth flight position p4. Likewise, the second and the sixth flight positions p2 and p6 are symmetrical on both sides of the fourth flight position p4 while the third and the fifth flight positions are symmetrical on both sides of the fourth flight position p4. A first distance between the first and the seventh flight positions p1 and p7 is represented by b1 along a first straight line SL1. Likewise, a second distance between the second and the sixth flight positions p2 and p6 is represented by b2 along a second straight line SL2. A third distance between the third and the fifth flight positions p3 and p5 is represented by b3 along a third straight line SL3.

Let a first vertical line L1 be drawn from the first flight position p1 to the first zone 58-1. Similarly, second through seventh lines L2, L3, L4, L5, L6, and L7 are drawn from the second through the seventh flight positions p2 to p7 to the second through the seventh zones 58-2 to 58-7, respectively. At the first flight position p1, the spacecraft picks up the partial image of the fourth zone 58-4 with a first angle $\theta 1$ formed relative to the first vertical line L1. Similarly, the spacecraft picks up the partial image of the fourth zone 58-4 with a second angle $\theta 2$ formed relative to the second vertical line L2 at the second flight position p2. At the third flight position p3, the spacecraft picks up the optical image of the fourth zone 58-4 with a third angle $\theta 3$ formed relative to the third vertical line L3. At the fifth, the sixth, and the seventh flight positions p5, p6, and p7, angles for picking up again the optical image of the fourth zone 58-4 are equal to the third, second, and the first angles $\theta 3$, $\theta 2$, and $\theta 1$, respectively. The first through the third angles $\theta 1$, $\theta 2$, and $\theta 3$ will be called first through third visual line angles, respectively.

The fourth vertical line L4 crosses the first through the third lines SL1 to SL3 at first through third cross points depicted at h1, h2, and h3, respectively. The first cross point h1 defines a first height H1 between the fourth zone 58-4 and the first cross point h1. Likewise, the second and the third cross points h2 and h3 define second and third heights H2 and H3 between the fourth zone 58-4 and the second cross point h2 and between the fourth zone 58-4 and the third cross point h3, respectively.

Taking the above into consideration, first through third base height ratios are given by b1/H1, b2/H2, and b3/H3, respectively. It is to be noted here that the first through the third base height ratios are related to the first through the third visual line angles $\theta1$ to $\theta3$, respectively.

Figure 6:
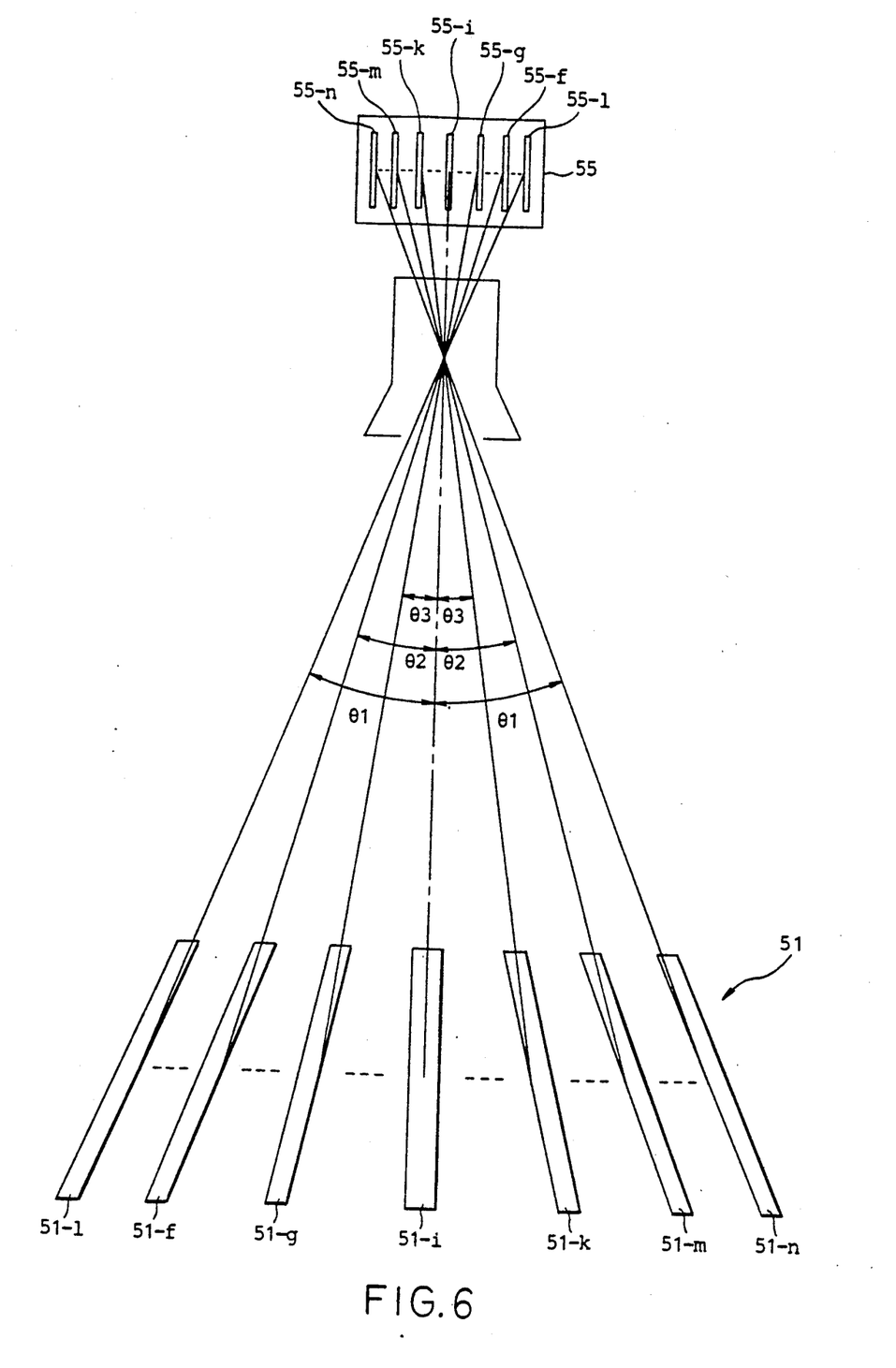
FIG. 6 is a schematic pictorial view of photoelectric transducers of the image pickup system and an object zone illustrated in FIG. 4.

Referring to FIG. 6 together with FIGS. 4 and 5, the description will proceed to the relation between the visual line angle and the visual angle. In FIG. 6, f-th, g-th, k-th, and m-th partial zones are depicted at 51-f, 51-g, 51-k, and 51-m in addition to the first, the i-th, and the n-th partial zones 51-1, 51-i, and 51-n. Similarly, f-th, g-th, k-th, and m-th photoelectric transducers are depicted at 55-f, 55-g, 55-k, and 55-m in addition to the first, the i-th, and the n-th photoelectric transducers 55-1, 55-i, and 55-n. It is assumed that the first, the f-th, the g-th, and the i-th partial zones 51-1, 51-f, 51-g, and 51-i correspond to the seventh, the sixth, the fifth, and the fourth zones 58-7, 58-6, 58-5, and 58-4 (FIG. 5), respectively, and that the k-th, the m-th, and the n-th partial zones correspond to the third, the second, and the first zones 58-3, 58-2, and 58-1 (FIG. 5), respectively. A first visual angle for covering the whole object zone 51 is determined by the number of the photoelectric transducer disposed between the first and the n-th photoelectric transducers 55-1 and 55-n and is equal to twice the first stereo angle $\theta1$ described in conjunction with FIG. 5. A second visual angle for covering the f-th through the m-th partial zones 51-f to 51-m is determined by the number of the photoelectric transducer disposed between the f-th and the m-th photoelectric transducers 55-f and 55-m and is equal to twice the second stereo angle $\theta2$. A third visual angle for covering the g-th through the k-th partial zones 51-g to 51-k is determined by the number of the photoelectric transducer disposed between the g-th and the k-th photoelectric transducers 55-g and 55-k and is equal to twice the third stereo angle $\theta3$.

It is assumed that the altitude H is equal to $100 \times 10^3$ (meters) and that the partial zone width W' is equal to 30 (meters). Furthermore, it is assumed that the odd number n is equal to one thousand and one and that the first through the third base height ratios b1/H1, b2/H2, and b3/H3 are equal to 0.3, 0.2, and 0.1, respectively. In this event, the numbers f, g, k, and m should be equal to 167, 333, 669, and 835, respectively. These numbers will later be used.

Referring back to FIG. 4, let the spacecraft fly over each partial zone in a time interval t1. A control circuit 60 receives a command signal transmitted from a ground station 80. The command signal is classified into a readout control signal, a mode selection signal, a transmission instruction signal, and a base height ratio designating signal which will later become clear. On reception of the readout control signal, the control circuit 60 produces a first readout signal 60-1 having a readout rate f1. The first through the n-th photoelectric transducers 55 transduce the partial images of the first through the n-th partial zones 51 into first through n-th partial analog signals. Responsive to the first readout signal 60-1, the first through the n-th photoelectric transducers 55 send the first through the n-th partial analog signals in parallel to an analog signal processor 61 in each time interval t1.

Responsive to the first through the n-th partial analog signals, the analog signal processor 61 carries out amplifying operation and parallel-to-serial conversion to produce a sequence of first through n-th amplified partial signals. The sequence of the first through the n-th amplified partial signals are supplied to a digital signal processor 62. The digital signal processor 62 converts the sequence of the first through the n-th amplified partial signals into a sequence of first through n-th partial digital signals. The first through the n-th partial digital signals are in one-to-one correspondence to the first through the n-th partial analog signals.

Meanwhile, the image processing unit 54 has a real time transmission mode and a memorizing mode. The real time transmission mode is for transmitting the first through the n-th partial digital signals to the ground station 80 in real time. The memorizing mode will later be described. The above-described mode selection signal is for selecting one of the real time transmission mode and the memorizing mode. Responsive to the mode selection signal, the control circuit 60 supplies a selection signal 60-2 to a selection circuit 63. The selection signal 60-2 is for selecting one of a modulator 64 and a signal processing unit 65. On reception of the mode selection signal for selecting the real time transmission mode, the control circuit 60 produces the selection signal 60-2 to select the modulator 64. In this event, the selection circuit 63 delivers the first through the n-th partial digital signals to the modulator 64. Supplied with the first through the n-th partial digital signals, the modulator 64 modulates the first through the n-th partial digital signals into first through n-th modulated partial signals and delivers the first through the n-th modulated partial signals to a transmitter 66. By using a down-link radio channel, the transmitter 66 transmits the first through the n-th modulated partial signals at a transmission rate f2 to the ground station 80 through an antenna 67.

Referring again to FIG. 7 together with FIG. 4, the signal processing unit 65 comprises a memory unit 71, a readout unit 72, and a signal processor 73. The control circuit 60 produces the selection signal 60-2 for selecting the signal processing unit 65 on reception of the mode selection signal for selecting the memorizing mode. When the control circuit 60 produces the selection signal 60-2 for selecting the signal processing unit 65, the selection circuit 63 delivers the first through the n-th partial digital signals to the memory unit 71. Supplied with the first through the n-th partial digital signals, the memory unit 71 temporarily memorizes the first through the n-th partial digital signals in the above-described memorizing mode as first through n-th memorized partial digital signals.

Figure 7:
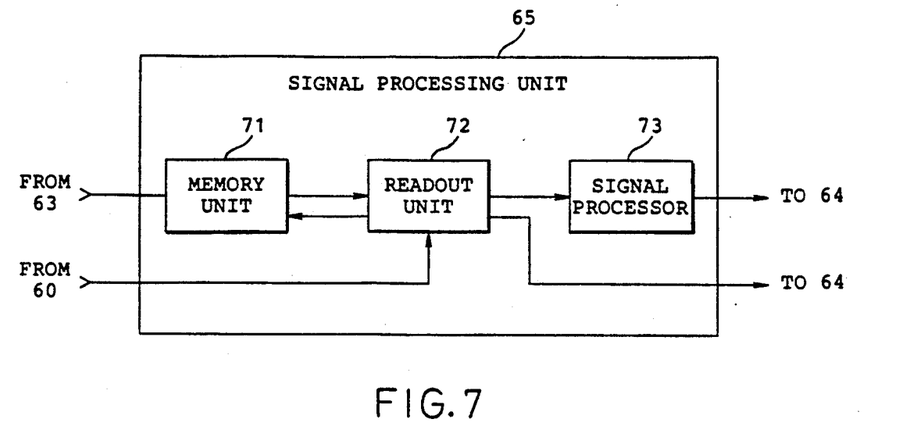
FIG. 7 is a block diagram of a signal processing unit of the image pickup system illustrated in FIG. 4.

The control circuit 60 further supplies a second readout signal 60-3 to the readout unit 72 when it receives whichever of the transmission instruction signal and the base height ratio designating signal. The transmission instruction signal is for reading all of the first through the n-th memorized partial digital signals out of the memory unit 71 as first through n-th readout partial digital signals. In this event, the readout unit 72 sends the first through the n-th readout partial digital signals to the modulator 64. The first through the n-th readout partial digital signals are modulated by the modulator 64 and transmitted from the transmitter 66 to the ground station 80 through the antenna 67.

The base height ratio designating signal is for designating at least two base height ratios in order to obtain at least two stereo images. Responsive to the base height ratio designating signal, the control unit 60 produces a readout instruction signal indicative of the first through the n-th memorized partial digital signals. When the first through the third base height ratios are equal to 0.3, 0.2, and 0.1 as described in conjunction with FIG. 6, the readout instruction signal indicates the first, the 167th, the 333rd, the 669th, the 835th, and the 1001st memorized partial digital signals.

Referring again to FIG. 8 together with FIGS. 4 to 7, the description will proceed to a case where the first through the third base height ratios are 0.3, 0.2, and 0.1, respectively, as described in conjunction with FIGS. 5 and 6. As shown in FIG. 5, let the spacecraft 50 fly from the first flight position p1 to the seventh flight position p7 in 1,001th time intervals.

Figure 8:
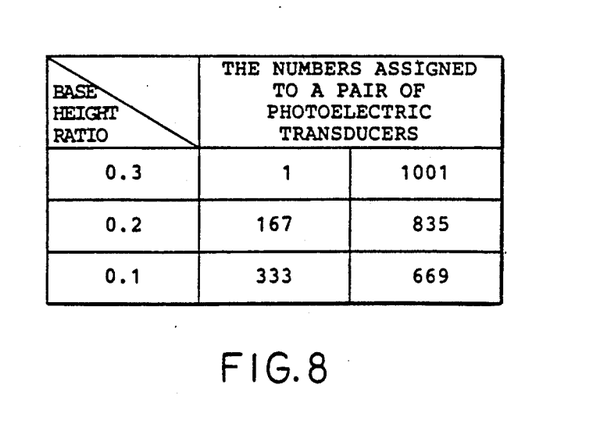
FIG. 8 is a table for use in describing operation of a signal processing unit illustrated in FIG. 7.

In this event, the image pickup system picks up the optical images, 1,001 in number, which are representative of the object zone 51 in 1,001 different manners because the spacecraft 50 flies over the partial zones, 1,001 in number. The memory unit 71 memorizes the first through the 1,001 partial digital signals of the optical images, 1,001 in number. The readout unit 72 reads the first, 167th, 333rd, 669th, 835th, and 1001st memorized partial digital signals out of the memory unit 71 as the first, 167th, 333rd, 669th, 835th, and 1001st readout partial digital signals. It is to be noted here that the first memorized partial digital signal corresponds to the first partial signal derived from 500th partial zone of the object zone 51 when the spacecraft 50 is present at the first flight position p1. The 167th memorized partial digital signal corresponds to 167th partial signal derived from the 500th partial zone when the spacecraft 50 is present at the second flight position p2. The 333rd memorized partial digital signal corresponds to 333rd partial signal derived from the 500th partial zone when the spacecraft 50 is present at the third flight position p3. The 669th memorized partial digital signal corresponds to 669th partial signal derived from the 500th partial zone when the spacecraft is present at the fifth flight position p5. The 835th memorized partial digital signal corresponds to 835th partial signal derived from the 500th partial zone when the spacecraft 50 is present at the sixth flight position p6. The 1001st memorized partial digital signal corresponds to 1001st partial signal derived from the 500th partial zone when the spacecraft is present at the seventh flight position p7.

The readout unit 72 supplies the signal processor 73 with the first and the 1001st readout partial digital signals, as a first pair of readout partial digital signals, the 167th and the 835th readout partial digital signals as a second pair of readout partial digital signals, and the 333rd and the 669th readout partial digital signals as a third pair of readout partial digital signals. Supplied with the first through the third pairs of readout partial digital signals, the signal processor 73 processes the first through the third pairs of readout partial digital signals in the manner known in the art and produces first through third stereo signals. The first through the third stereo signals are modulated into first through third modulated stereo signals by the modulator 64 and transmitted from the transmitter 66 to the ground station 80 through the antenna 67.

The above-described operation is repeated until the 1001st photoelectric transducer 55-1001 (depicted at 55-n) picks up the partial images of the first through the 1001st partial zones 51. In practice, the signal processing unit 65 produces a sequence of the first stereo signals, a sequence of the second stereo signals, and a sequence of the third stereo signals. The sequences of the first through the third stereo signals are modulated by the modulator 64 into a sequence of first modulated stereo signals, a sequence of second modulated stereo signals, and a sequence of third modulated stereo signals. As a result, it is possible to obtain the first through the third stereo signals of each of the 500th through the 1001st partial zones with the first through the third base height ratios. Generally speaking, it is possible to obtain the stereo images, $(n-1)/2$ in number, with the first through $(n-1)/2$-th base height ratios.

The readout unit 72 may directly send the first through the third pairs of readout partial digital signals to the modulator 64. This is effective in case where the transmission rate f2 is lower than the readout rate f1.

Referring again to FIG. 9 together with FIGS. 4 and 5, the description will proceed to the ground station 80 which is used as a part of an image pickup system according to this invention. Let the image pickup system pick up the optical images, equal to the first through the n-th partial zones 51, of the object zone which is specific to the first through the seventh flight positions p1 to p7. The ground station 80 comprises a control unit 81 for generating the command signal which is classified into the readout control signal, the mode selection signal, the transmission instruction signal, and the base height ratio designating signal. A transmitter 82 transmits the command signal through an antenna 83 by using an up-link radio channel. When the control unit 81 produces the mode selection signal for selecting the real time transmission mode, a receiver 84 receives the first through the n-th modulated partial signals transmitted in real time from the transmitter 66 (FIG. 4). A demodulator 85 demodulates the first through the n-th modulated partial signals into first through n-th demodulated partial signals.

Figure 9:
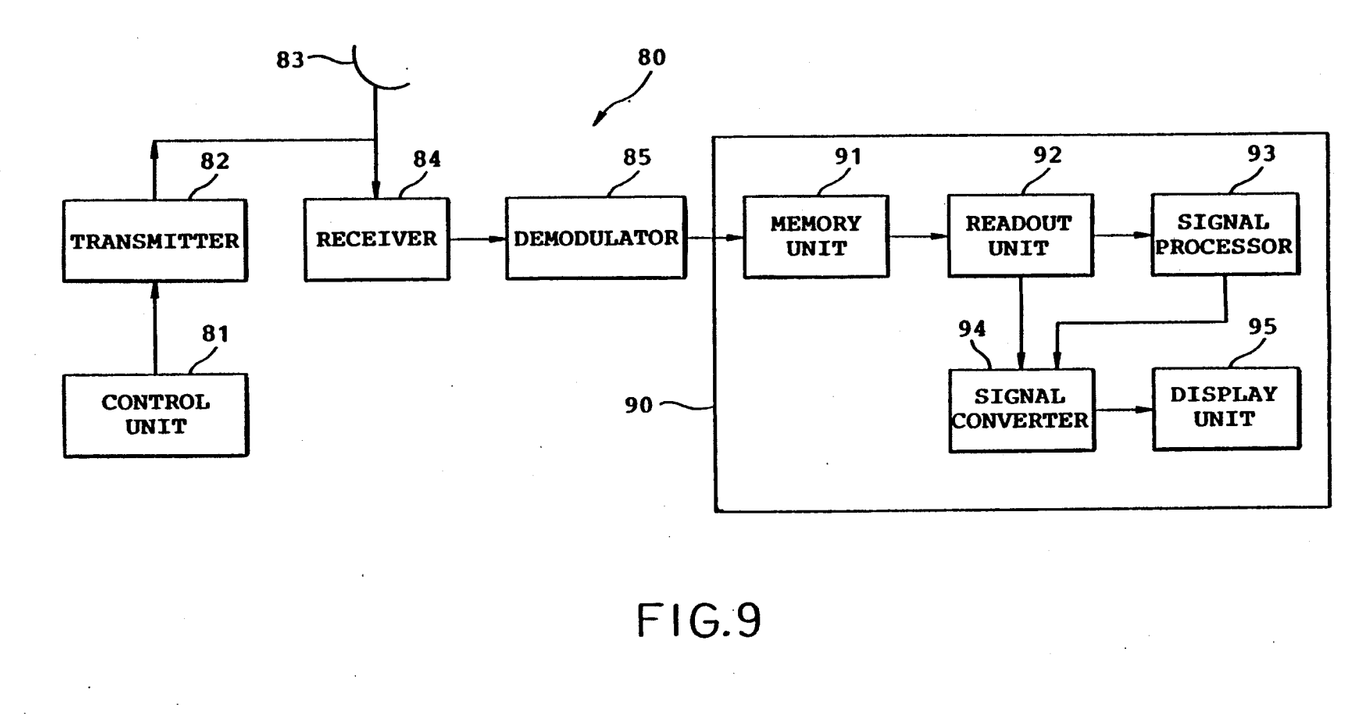
FIG. 9 is a schematic block diagram of a ground station operable as a part of the image pickup system illustrated in FIG. 4.

The first through the n-th demodulated partial signals are supplied to a signal processing unit 90. The signal processing unit 90 comprises a memory unit 91, a readout unit 92, a signal processor 93, a signal converter 94, and a display unit 95. The memory unit 91 memorizes the first through the n-th demodulated partial signals as first through n-th memorized signals.

When a nonstereo image is required, the readout unit 92 reads the i-th memorized signal out of the memory unit 91 as a nonstereo signal. When the i-th memorized signal is repeatedly read n times, the readout unit 92 produces first through n-th nonstereo signals. The first through the n-th nonstereo signals are in one-to-one correspondence to the first through the n-th partial zones 51 and are supplied to the signal converter 94. The signal converter 94 converts the first through the n-th nonstereo signals to a television image signal and delivers the television image signal to the display unit 95. The display unit 95 displays the nonstereo image of the object zone.

Figure 10:
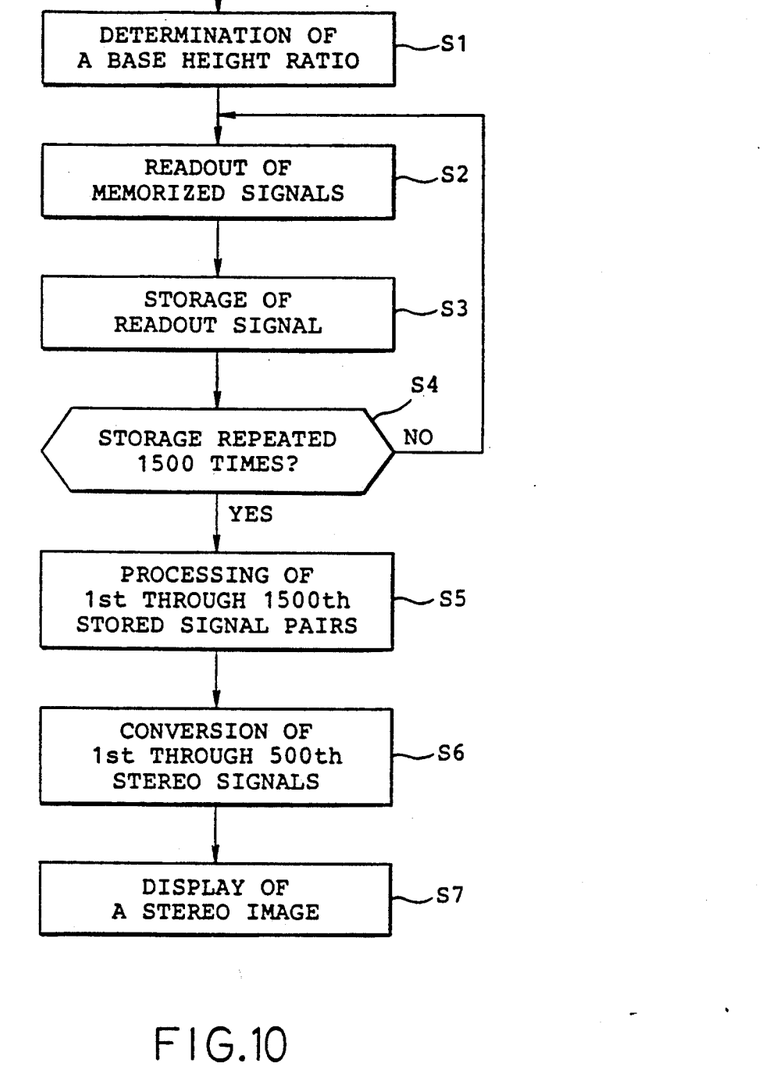
FIG. 10 is a flow chart for use in describing operation of a signal processing unit of the ground station illustrated in FIG. 9.

Referring afresh to FIG. 10 together with FIG. 9, the description will proceed to the case where a stereo image is required and where the base height ratio is 0.3 described in conjunction with FIG. 8. Let the image pickup system pick up first through 1500th optical images during which the spacecraft 50 flies over the partial zones, 1500 in number. The first through the 1001st demodulated partial signals has been stored in the memory unit 91 in connection with the first through the 1500th optical images as first through 1001st memorized signals.

At a first step s1, the base height ratio is determined equal to 0.3.

At a second step s2, the readout unit 92 reads the first and 1001st memorized signals for the first optical image out of the memory unit 91 as a first pair of first and 1001st readout signals.

At a third step s3, the first pair of the first and the 1001st readout signals are stored in the signal processor 93 as a first pair of first and 1001st stored signals. Such a storing operation is repeated as will shortly be described. The signal processor 93 counts how many times the storing operation is carried out.

At a fourth step s4, the signal processor 93 distinguishes whether or not the number of times of the storing operation is equal to 1500. If the number is less than 1500, the fourth step s4 turns back to the second step s2. In the second step s2, the readout unit 92 reads the first and the 1001st memorized signals for a second optical image out of the memory unit 91 as a second pair of first and 1001st readout signals. In the third step s3, the second pair of the first and the 1001st readout signals are stored in the signal processor 93 as a second pair of first and 1001st stored signals. The second through the fourth steps s2 to s4 are repeated until the number of times of storing operation is judged in the fourth step s4 to be equal to 1,500. When the number becomes equal to 1,500, the first through the 1500th pairs are stored in the signal processor 93 in connection with the first and the 1001st stored signals.

The fourth step s4 now proceeds to a fifth step s5, at which the signal processor 93 processes the first through 1500 pairs of stored signals. The signal processor 93 produces a first stereo signal by processing the first stored signal of the first pair and the 1001st stored signal of the 1001st pair. Subsequently, the signal processor 93 produces a second stereo signal by processing the first stored signal of the second pair and the 1001st stored signal of the 1002nd pair. As a result, the signal processor 93 produces the first through the 500th stereo signals. The first through the 500th stereo signals are supplied to the signal converter 94.

At a sixth step s6, the signal converter 94 converts the first through the 500th stereo signals to a television image signal.

At a seventh step s7, the display unit 95 displays the television image signal as the stereo image of the object zone.

As described in conjunction with FIGS. 4 and 7, the transmitter 66 transmits the sequence of the first modulated stereo signals, the sequence of the second modulated stereo signals, and the sequence of the third modulated stereo signals to the ground station 80. In FIG. 9, the receiver 84 receives the sequences of the first through the third modulated stereo signals. The demodulator 85 demodulates the sequences of the first through the third modulated stereo signals into a sequence of first demodulated stereo signals, a sequence of second demodulated stereo signals, and a sequence of third demodulated stereo signals and delivers the sequences of the first through the third demodulated stereo signals to the memory unit 91. The memory unit 91 memorizes the sequences of the first through the third demodulated stereo signals as a sequence of first memorized stereo signals, a sequence of second memorized stereo signals, and a sequence of third memorized stereo signals. In order to obtain a first stereo image with the first base height ratio, the readout unit 92 reads the sequence of the first memorized stereo signals out of the memory unit 91 as a sequence of first readout stereo signals and supplies the sequence of the first readout stereo signals to the signal converter 94. The signal converter 94 converts the sequence of the first readout signals to a first television image signal. The display unit 95 displays the first television image signal as the stereo image of the object zone with the first base height ratio.

While this invention has thus far been described in conjunction with a preferred embodiment thereof, it will readily be possible for those skilled in the art to put this invention into practice in various other manners. For example, the number n may an even number which is greater than three. This invention is applicable to a craft other than a spacecraft. The optical system may form a plurality of optical images of the object zone on a plurality of focussing areas at a time by using a plurality of spectral filters which have spectral characteristics different from one another. In this case, a plurality of photoelectric transducing members are disposed on the respective focussing areas. In FIG. 5, the first and the seventh flight positions p1 and p7 may not be symmetrical on both sides of the fourth flight position p4 because there is a case that the flight path of the craft varies with the lapse of time. Similarly, the second and the sixth flight positions p2 and p6, and the third and the fifth flight positions p3 and p5 may not be symmetrical on both sides of the fourth flight position p4.

What is claimed is:

1. In an image pickup system for a craft flying in a predetermined direction over an object zone, wherein the image pickup system comprises an optical system located in the craft for producing an optical image of said object zone on a focussing area of the optical system and image processing means coupled to the optical system for electrically processing the optical image, the image processing means comprising:

a predetermined number including at least five photoelectric transducers associated with said focussing area to convert said optical image into partial electrical signals representative of partial zones of said object zone when said craft flies over each of said object zones, said partial zones being in one-to-one correspondence to said photoelectric transducers;

signal processing means coupled to said photoelectric transducers for processing said partial electric signals into a plurality of stereo images; and means for enabling designating at least two base height ratios for obtaining said stereo signals.

2. An image pickup system as claimed in claim 1, said signal processing means located in said craft and connected to said photoelectric transducers.

3. An image pickup system as claimed in claim 1, said signal processing means located in an earth station and coupled to said photoelectric transducers through a radio channel.

4. An image pickup system as claimed in claim 1, wherein said photoelectric transducers are divided into forward transducers and backward transducers by a center line lying transversely of said predetermined direction, in a manner which divides said optical image into forward and backward images, said forward and said backward transducers dividing said partial electrical signals into forward electrical signals representative of said forward image and backward electrical signals representative of said forward image and backward electrical signals representative of said backward image, said forward and said backward transducers including a forward and a backward transducer which are symmetrically disposed on both sides of said center line and spaced apart by a preselected number of said photoelectric transducers, said preselected number determining for said optical system a visual angle which covers a part of said object zone that consists of the partial zones of said preselected number.

5. An image pickup system as claimed in claim 4, said craft being capable of flying from a first flight position to a second flight position spaced apart from said first flight position along a distance corresponding to said predetermined number of partial zones, said signal processing means comprising:

memory means for memorizing said forward and said backward electrical signals as memorized forward signals and memorized backward signals; and readout means connected to said memory means for reading at least one of said memorized forward signals and at least one of said memorized backward signals out of said memory means as a readout forward signal and a readout backward signal, said at least one of the memorized forward signals comprising one of the forward electrical signals that is converted by said forward transducer when said craft is present at said first flight position, said at least one of the memorized backward signals comprising one of the backward electrical signals that is converted by said backward transducer when said craft is present at said second flight position, said readout forward and backward signals serving as said partial electrical signals.

6. In an image pickup system for a craft flying in a predetermined direction over an object zone, wherein the image pickup system comprises an optical system located in the craft for producing an optical image of the object zone on a focussing area of the optical image of the object zone on a focussing area of the optical system and image processing means coupled to the optical system for electrically processing the optical image, the image processing means comprising:

a predetermined number including at least five photoelectric transducers associated with said focussing area for converting said optical image into partial electrical signals representative of partial zones of said object zone when said craft flies over each of said partial zones, said partial zones being in one-to-one correspondence to said photoelectric transducers, said photoelectric transducers being divided into forward transducers and backward transducer by a center line lying transversely of said predetermined direction, in a manner which divides said optical image into forward and backward images, said forward and said backward transducers dividing said partial electrical signals into forward electrical signals representative of said forward image and backward electric signals representative of said backward image, said forward and said backward transducers including a forward and backward transducer which are symmetrical on both sides of said center line and spaced apart by a preselected number of said photoelectric transducers, said preselected number determining for said optical system a visual angle which covers a part of said object zone that consists of the partial zones of said preselected number; and signal processing means coupled to said photoelectric transducers for processing said forward and said backward electrical signals into a plurality of stereo images.

7. An image pickup system as claimed in claim 6, said craft being capable of flying from a first flight position to a second flight position spaced apart from said first flight position by a distance corresponding to said predetermined number of partial zones, said signal processing means comprising:

memory means for memorizing said forward and said backward electrical signals as memorized forward signals and memorized backward signals; and readout means connected to said memory means for reading at least one of said memorized forward signals and at least one of said memorized backward signals out of said memory means as a readout forward signal and a readout backward signal, said at least one of the memorized forward signals comprising one of the forward electrical signals that is converted by said forward transducer when said craft is present at said first flight position, said at least one of the memorized backward signals comprising one of the backward electrical signals that is converted by said backward transducer when said craft is present at said second flight position, said readout forward and backward signals serving as said partial electrical signals.

* * * * *